United States Patent [19]  
Thomas

[11] 4,324,347  
[45] Apr. 13, 1982

[54] SEED DRILL APPARATUS  
[76] Inventor: David W. Thomas, Fraithwen, Tregynon, Newtown, Powys, Wales, SY16 3EW  
[21] Appl. No.: 175,874  
[22] Filed: Aug. 6, 1980  
[51] Int. Cl.³ ............................................. A01C 7/04  
[52] U.S. Cl. ................................... 221/237; 221/266; 221/267; 221/303  
[58] Field of Search ............... 221/231, 233, 237, 266, 221/267, 277, 303, 307, 310

[56] References Cited  
U.S. PATENT DOCUMENTS  
1,695,460 12/1928 Iwanicki ............................... 221/237  
2,053,390 9/1936 Bateman et al. ................. 221/237 X  
4,094,444 6/1978 Willis ................................... 221/266

FOREIGN PATENT DOCUMENTS  
135148 3/1933 Austria ................................. 221/266  
227013 10/1961 Austria ................................. 221/233  
410440 10/1923 Fed. Rep. of Germany ...... 221/233

Primary Examiner—Joseph J. Rolla  
Attorney, Agent, or Firm—Emory L. Groff, Jr.

[57] ABSTRACT

A speed drill apparatus has a seed storage box SB with seed inlet manifold 2 to convey seeds to a rotatable collector wheel 5 having a number of peripheral seed receiving cavities 6. The seeds are ejected singly, assisted by a blade edge 11 running in a groove 5a joining the centers of the cavities, through an aperture B in casing 1 to fall into a groove 8 around the periphery of a distributor wheel 7. The groove 8 is subdivided by stops 9 into arcuate sectors each of which receives a seed. A retardation device 12 catches a seed in the groove 8 and holds same until carried on by a stop 9. The seed falls to the ground through outlet 13. The wheel 7 has a peripheral speed equal to the linear speed of motion over the ground and wheel 5 rotates more slowly with a reduction dependent on the ratio between the number of cavities 6 and number of stops 9. The retardation device 12 ensures accuracy of spacing by providing for discharge of each seed only when in abutment with a stop 9.

12 Claims, 10 Drawing Figures

DIRECTION OF MOVEMENT

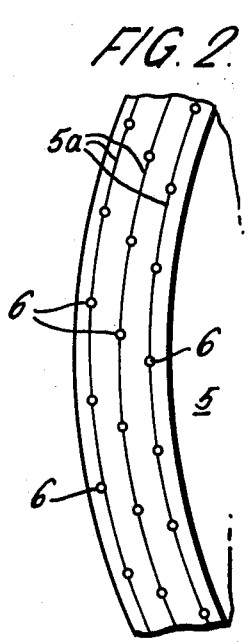
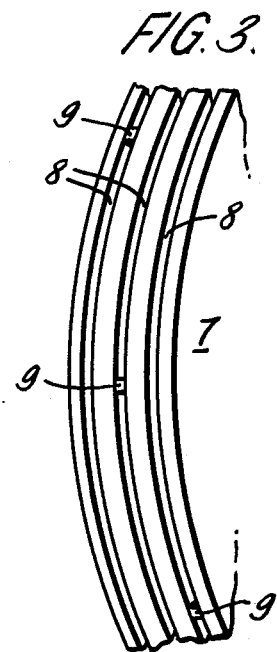
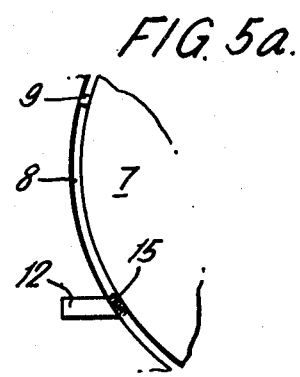
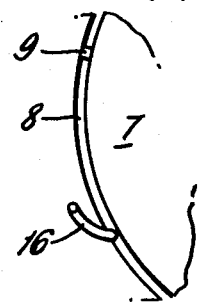
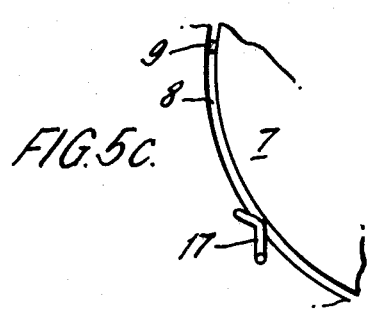
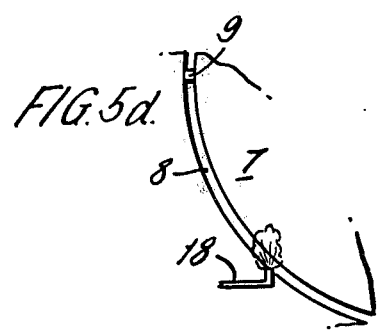

SEED DRILL APPARATUS

BACKGROUND OF THE INVENTION

This invention relates to a seed drill apparatus for sowing seeds with accuracy of spacing along a row.

Conventional seed drills have a seed pick-up and distribution means which frequently results in missed or erratic seed spacing, this being due to the fact that the linear speed component of ejection cannot be accurately matched to the travel speed of the drill. Another disadvantage of such known seed drills arises from the shallow angle of seed ejection causing seeds to skip and bounce on hitting the ground resulting in large and erratic seed displacements. Accuracy is especially important for even growth of each plant for mechanical harvesting.

The primary object of this invention is to provide an improved construction of apparatus which is simple and in which accurate and predictable placement of the seeds on the ground is made even at high travel speeds of the sowing equipment.

SUMMARY OF THE INVENTION

According to this invention there is provided a seed drill apparatus having an inlet manifold for a seed supply to convey seeds to a rotatable seed collector wheel including a plurality of seed receiving cavities in spaced location around the periphery thereof, a rotatable seed distributor wheel adjacent said collector wheel and including a groove to receive a seed from a cavity to transfer same to a seed release outlet the groove having one or more abutment stops with means to bring a seed into contact with the stop prior to release at the outlet.

The apparatus is arranged so that the fixed drive ratio between the rotational speeds of the collector wheel and the distributor wheel is equivalent to the ratio between the number of receiving cavities in the collector wheel and the number of abutment stops in the distributor wheel. The distributor wheel thus rotates relatively fast and has a peripheral speed equal to the linear travel speed of the apparatus over the ground so that the seeds are released without a linear ground speed component. In an example the collector wheel has forty two cavities and the distributor wheel has 3 stops with a ratio of 14:1 between the wheel speeds.

In such an arrangement the seed from a cavity can be released to the distributor wheel over a fairly wide arc and in order to ensure accuracy in release from the distributor wheel to the ground an essential and important feature of the invention is the means which brings a seed into abutment with the stop thus ensuring precise spacing of the sowed seeds. This means, hereinafter called a "retardation means" may be mechanical such as a spring finger device to draw the seed back onto the stop, a brush or arm or an air jet.

A seed ejector means may be provided to assist displacement of each individual seed from the collector wheel cavities perpendicularly downward into the groove of the distributor wheel, for example a blade may be located in the casing to effect this.

Such a blade is preferably in the form of a separate steel insert located between the collector and distributor wheels, the dispensing edge of which blade lies within a thin peripheral groove in the collector wheel along which groove the seed recepticles are spaced. Rotation of the collector wheel causes each seed to encounter the blade edge whereupon the seed is positively and accurately dispensed into the distributor wheel groove.

The apparatus preferably includes suitable ground drive means, for example wheels, which, through a suitable gearing arrangement, cause both collector and distributor wheels to rotate. The speed of either wheel may be made variable by an arrangement of sprockets and preferably the angular rotation of distributor wheel is of the order of twenty times that of the seed collector wheel. Additionally the peripheral speed of the distributor wheel is made equal to the ground speed at which the seed drill apparatus travels.

By arranging for the peripheral boundary of both wheels to be enclosed in a casing the seeds are maintained in their individual cavities and within the groove respectively, the casing is preferably a casting of metal and prevents gravitational displacement except where transfer between the wheels occurs and release to the ground.

The accurately positioned dispensing blade edge, together with a specific relationship in the drive ratio between the collector and distributor wheels ensures that only one seed falls into each section of the seed retaining groove defined by the stops in the distributor wheel.

BRIEF DESCRIPTION OF THE DRAWINGS

The invention is further described by way of example with reference to the accompanying drawings illustrating a preferred embodiment and in which:

FIG. 2 is a view of part of the periphery of a modified collector wheel, FIG. 3 is a view of part of the periphery of a modified distributor wheel, FIGS. 5a to 5d illustrate various further retardation devices.

DESCRIPTION OF PREFERRED EMBODIMENT

The drawings show only the seed drill unit with which the invention is concerned and the main construction which may include a number of units with ground bearing wheels, furrow forming and covering coulters is not shown as such parts are well known.

Figure 1:
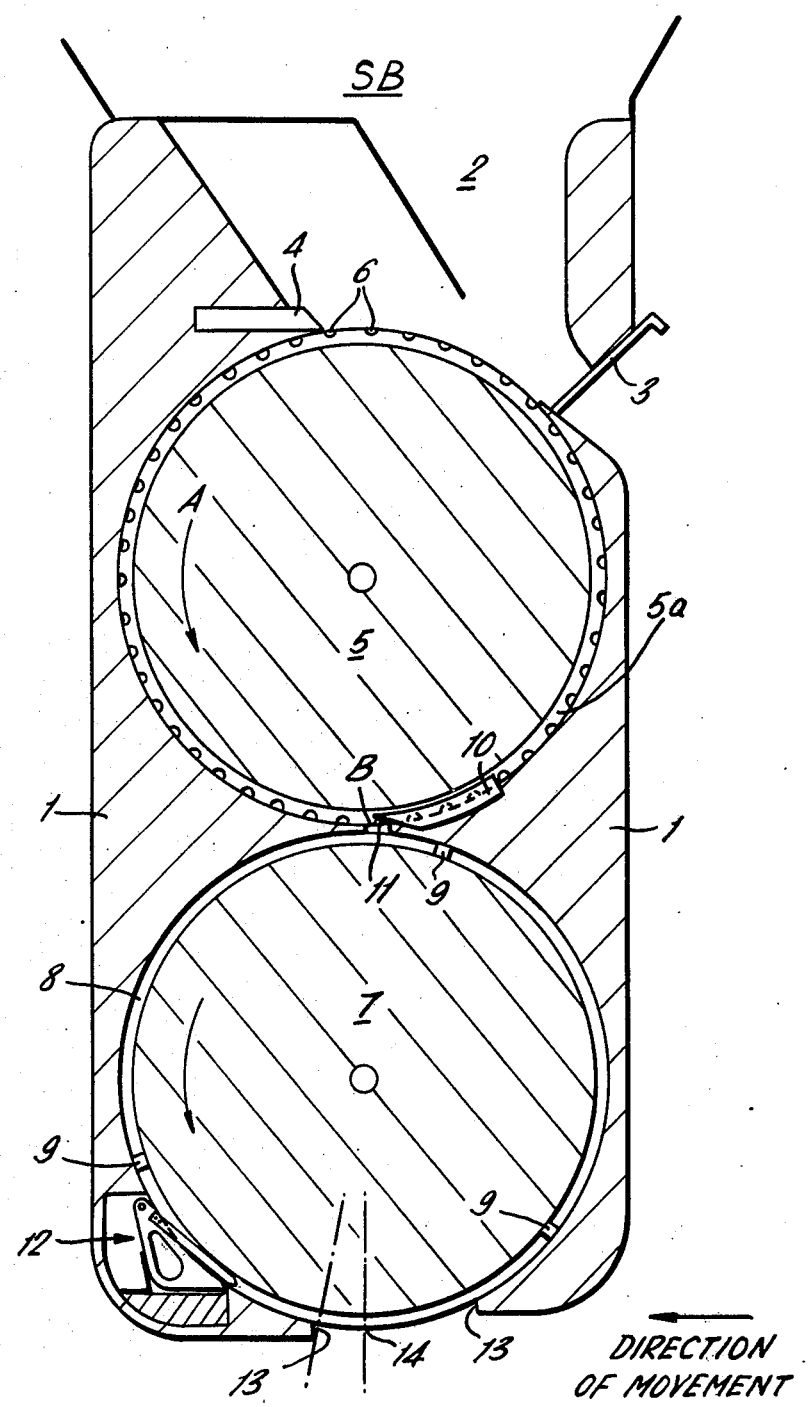
FIG. 1 is a side elevation in section of a seed drill apparatus according to the invention.

Referring firstly to FIG. 1, the seed drill apparatus comprises a cast alloy casing 1 provided with a seed inlet manifold 2 which receives bulk seed from a seed box SB located above the apparatus. This manifold 2 includes a surplus seed removal gate 3 manually operable to remove unused seed. Within the casing a scraper blade 4 is situated in close proximity to a collector wheel 5 such that upon rotation of the latter only one seed will enter each cavity 6. The cavities 6 are of a size only slightly larger than each seed and equidistantly spaced around the circumference of the collector wheel 5. In practice the cavities will be a standard size to receive graded natural or pellitised seeds.

The wheel 5 is readily changeable for different size seeds and is located closely adjacent the casing so that seeds are retained in the cavities during rotation in the direction A. The wheel 5 thus serves to collect individual seeds from the supply and transfer them at a controlled rate to a discharge point defined by an aperture B in the casing.

To effect consistent discharge an edge 11 of a seed ejector blade 10 lies in a thin groove 5a around the periphery of the collector wheel 5 and passing through each seed cavity 6. The blade contacts each seed as it reaches the aperture B and ejects same to fall into a continuous groove 8 extending around the periphery of a distributor wheel 7. The distributor wheel 7 is located also in the casing 1 immediately beneath the collector wheel 5. The seed retaining groove 8 is divided into sectors by a number of stops or walls 9 forming abutments and against which each seed dispensed from the collector wheel is brought into firm contact during rotation of the wheel 7 in the final part of the rotation before release of a seed.

To achieve this there is provided towards the bottom of the casing 1 and prior to a seed release outlet 13 in the casing 1, a retardation means 12 which serves to retard or hold back a seed which may be in the groove 8 before the stop 9. Rotation of the distributor wheel will then cause the stop to catch up with the seed held by means 12 temporarily and to thereafter dispense such seed through the outlet 13 in the apparatus casing at the correct instant.

The retardation device is an important feature for without this the exact point of discharge of the seed, in time, is unpredictable because it can lie anywhere in the sector of the groove between two adjacent stops, and can "Bounce" within the groove resulting in unpredictable spacings.

The retardation device 12 is therefore located prior to the release point 14 for the seed, which lies within 10° to 20° before bottom dead centre of the stop 9 in distributor wheel 14.

Gearing of both wheels 5 and 7 to the ground drive is by an arrangement of chain and sprockets (not shown) located on the rear of the cast body 1.

Referring to FIGS. 2 and 3, in a further embodiment of the invention more than one peripheral row of seed cavities 6 with grooves 5a can be arranged around the circumference of the seed collector wheel 5 and in this case identical numbers of grooves 8 are required in the distributor wheel 7, so arranged as to lie in the corresponding vertical plane and each provided with abutment walls or stops 9 to effectively release each seed.

This modification is used when it is required to effect seeding at a greater speed or at closer spacing in relation to the forward speed of the drill. In practice the lateral spacing of the seeds is insignificantly small so that, in the case shown, three times as many seeds are shown as in the previous embodiment.

Figure 4:
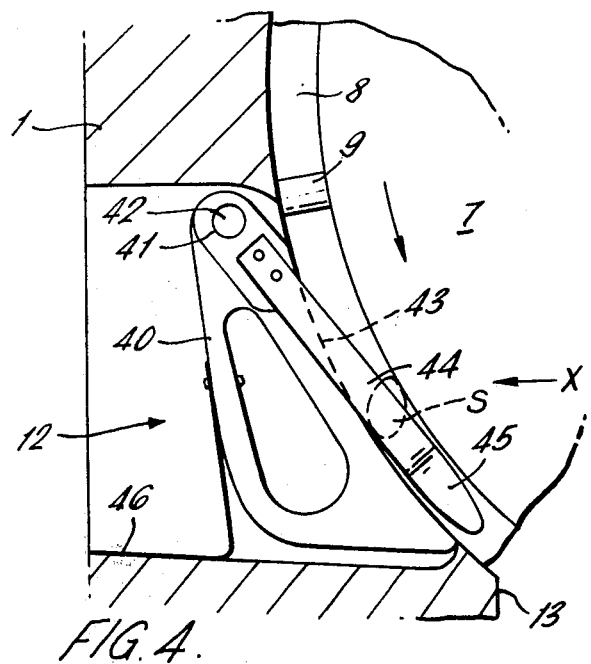
FIG. 4 shows a fragmentary side view of the casing part and one form of retardation means.
Figure 4A:
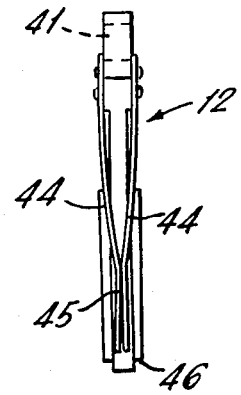
FIG. 4a is a view of the retardation means looking in direction X as marked on FIG. 4.
Figure 4B:
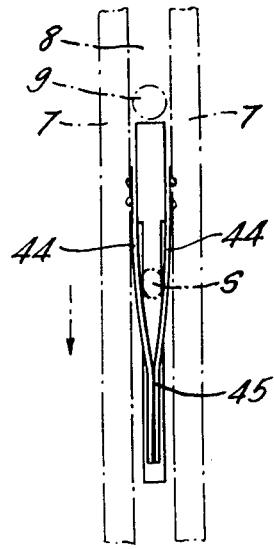
FIG. 4b is a view looking in direction X of FIG. 4 showing the action of the retardation means.

FIGS. 4, 4a and 4b show in more detail the retardation device 12. This comprises a metal carrier 40 with an aperture 41 which engages a spigot 42 in the casing and shaped at 43 to conform with the periphery of the wheel 7. Two spring steel blades 44 are spaced and lie within the groove 8 the blades are shaped to come together at their ends 45 thus trapping any seeds that may lie in the groove until the stop 9 abuts the seed and causes the blades to open to allow same to pass. The seeds will thus be consistently brought into abutment with stop 9 prior to release.

A leaf spring 46 ensures that the retardation device is pressed towards the wheel 7 through pivoting about spigot 42.

FIG. 4b shows the action and positioning of the two springs in the groove with the groove 8, pin 9 and seed S shown in chain dot.

FIGS. 5a to 5d show diagrammatically other forms of retardation devices.

In each Figure, the distributor wheel 7 and associated groove 8 remain unchanged. FIG. 5a shows a cartridge 12 with a nylon brush 15; FIGS. 5b and 5c show two forms of spring loaded fingers of PTFE for example arranged in different configurations 16 and 17 respectively; FIG. 5d shows a right angle bend pipe 18 providing a low pressure air supply upwards into the groove 8.

The seed drill in accordance with this invention thus provides an apparatus and method for precision seed sowing, with greater control and less wastage than with prior art apparatus and enabling relatively high speeds to be achieved.

I claim:

1. A seed drill apparatus comprising an inlet manifold for connection with a seed supply means; a seed collector wheel rotatably mounted in a casing and including a plurality of seed receiving cavities in spaced location around the periphery thereof, a portion of the periphery of said collector wheel lying adjacent said manifold whereby each cavity may receive a seed; a seed distributor wheel rotatably mounted in said casing adjacent and beneath said collector wheel, a gap in the casing defining a seed transfer aperture between said collector wheel and said distributor wheel, said distributor wheel including a peripheral groove to receive a seed dropping through said transfer aperture from a cavity in said collector wheel and to transfer said seed to a seed release outlet beneath said distributor wheel, the groove having therein one or more abutment stops; seed retardation means being located in the casing operatively engaging said groove to bring a seed into contact with the stop prior to release at the outlet.

2. A seed drill apparatus as claimed in claim 1, wherein the retardation means to bring the seed into engagement with the stop comprises an air jet directed into the groove against the rotational direction of the distributor wheel.

3. A seed drill apparatus according to claim 1, wherein the said collector wheel has a peripheral slit passing through each cavity, an ejector blade mounted in the casing and engaging the slit, said blade having an edge obliquely inclined to abut and eject a seed from the cavity for transfer to the distributor wheel.

4. A seed drill apparatus according to claim 1, wherein the seed release outlet comprises an opening in the casing positioned at 10° to 20° before the bottom dead centre position of an abutment stop in the distributor wheel and close to the retardation means to bring the seed into contact with the stop.

5. A seed drill apparatus according to claim 1, wherein the upper part of the casing forms the inlet manifold with the bottom thereof defined by the periphery of the collector wheel.

6. A seed drill apparatus as claimed in claim 1, wherein the retardation means comprises a resilient member secured to the casing and engaging the groove, said member retarding a seed sufficiently to enable the stop to abut same, the stop thereafter carrying the seed past the member which yields.

7. A seed drill apparatus as claimed in claim 6, wherein the resilient member is a finger of a resilient material or a rigid material resiliently mounted to the casing so that an end thereof engages the groove and is displaced temporarily by the stop.

8. A seed drill apparatus as claimed in claim 6, wherein the resilient member is detachably located in a cavity in the casing adjacent the distributor wheel and close to the seed release outlet.

9. A seed drill apparatus as claimed in claim 6, wherein the resilient member is a leaf spring.

10. A seed drill apparatus as claimed in claim 9, wherein the resilient member is formed by two leaf springs in side by side converging relationship with their one ends touching and positioned in the groove so that a seed may enter the gap between the springs which diverge and open to allow passage of the stop.

11. A seed drill apparatus as claimed in claim 1, wherein the collector and distributor wheels are positioned within the casing with said casing having portions closely adjacent the peripheries of each wheel over arcs through which the cavities or grooves are occupied by a seed whereby the seed is retained in said cavities or grooves over said arcs during rotation of the wheels.

12. A seed drill apparatus as claimed in claim 11, wherein the wheels are located in the casing with the peripheries closely adjacent and communicating through the seed transfer aperture provided in a wall of the casing separating the wheels.

* * * * *